US008240626B2

(12) United States Patent
Kennedy

(10) Patent No.: US 8,240,626 B2
(45) Date of Patent: Aug. 14, 2012

(54) RECYCLING SYSTEM AND CARRYING APPARATUS

(76) Inventor: Matthew P. Kennedy, Charlotte, NC (US)

( * ) Notice: Subject to any disclaimer, the term of this patent is extended or adjusted under 35 U.S.C. 154(b) by 228 days.

(21) Appl. No.: 12/536,581

(22) Filed: Aug. 6, 2009

(65) Prior Publication Data

US 2010/0032439 A1 Feb. 11, 2010

Related U.S. Application Data

(60) Provisional application No. 61/086,545, filed on Aug. 6, 2008.

(51) Int. Cl.
*F16B 45/00* (2006.01)

(52) U.S. Cl. ..................... 248/308; 248/322; 248/213.2; 224/268; 220/23.4

(58) Field of Classification Search .................. 248/322, 248/339, 304, 308, 307, 306, 305, 215, 213.2, 248/150, 163.2, 176.1, 181.2, 288.31, 274.1, 248/288.51; 224/268, 269, 270, 432, 444, 224/452, 458, 497, 499, 314; 220/23.4, 751, 220/909, 476, 478, 480, 482, 481
See application file for complete search history.

(56) References Cited

U.S. PATENT DOCUMENTS 76,706 A * 4/1868 Brevoort ......................... 403/68
230,521 A * 7/1880 Barker .......................... 248/516
245,659 A * 8/1881 Renner, Jr. .................... 248/516
601,523 A * 3/1898 Orchard ................... 248/229.15
711,621 A * 10/1902 Fergusson ................ 248/229.12
1,234,509 A * 7/1917 Tetrault ....................... 248/213.2
1,353,853 A * 9/1920 Sandberg ...................... 248/208
1,460,554 A * 7/1923 Moore .......................... 294/159
1,483,799 A * 2/1924 Hall ............................. 220/476
1,515,011 A * 11/1924 Cotter ........................ 248/213.2
1,537,174 A * 5/1925 Liskow ............................ 220/6
1,590,227 A * 6/1926 Britton .......................... 248/103
2,065,799 A * 12/1936 Fine ........................... 248/213.2
2,116,576 A * 5/1938 Hormann ...................... 248/310
2,185,164 A * 12/1939 Weinreb .......................... 24/523
2,235,182 A * 3/1941 Weston ......................... 248/100
2,289,701 A * 7/1942 Engel et al. ................ 248/311.2
2,628,054 A * 2/1953 Fazakerley ................. 248/311.2
2,992,854 A * 7/1961 Berlin .......................... 297/256
3,009,613 A * 11/1961 Noland ........................ 224/265
3,391,891 A * 7/1968 Garden ...................... 248/311.2
3,490,726 A * 1/1970 Mills ............................ 248/313
4,715,293 A * 12/1987 Cobbs ............................ 108/43
4,949,924 A * 8/1990 Carmody ...................... 248/215
5,713,499 A * 2/1998 Daniel .......................... 224/401
5,738,319 A * 4/1998 Grassi ........................... 248/215
6,250,595 B1 * 6/2001 Campbell ..................... 248/211
6,607,088 B2 * 8/2003 Cestrone .................... 220/23.86
7,025,712 B2 * 4/2006 Parrilla ......................... 482/104
7,036,778 B2 * 5/2006 Ferrell ....................... 248/213.2
7,185,865 B1 * 3/2007 Patrick .......................... 248/318
7,448,688 B2 * 11/2008 Farah ....................... 297/423.39

(Continued)

*Primary Examiner* — Kimberly Wood
(74) *Attorney, Agent, or Firm* — Trego, Hines & Ladenheim, PLLC

(57) ABSTRACT

A recycling system and carrying apparatus to allow individuals to carry recycling containers and the like. The carrying apparatus includes at least one support arm adapted to engage a support such that the carrying apparatus hangs therefrom, and at least one carrying arm operably connected to the at least one support arm. The carrying arm is adapted to secure an item to be carried by the carrying apparatus. The at least one carrying arm is adapted to pivot relative to the at least one support arm.

7 Claims, 20 Drawing Sheets

U.S. PATENT DOCUMENTS

| | | | | |
|---|---|---|---|---|
| 7,878,364 | B1 * | 2/2011 | Anderson | 220/735 |
| 2001/0054614 | A1 * | 12/2001 | Cestrone | 220/23.4 |
| 2004/0035866 | A1 * | 2/2004 | Cestrone | 220/23.4 |
| 2007/0246991 | A1 * | 10/2007 | Farah | 297/423.39 |

* cited by examiner

RECYCLING SYSTEM AND CARRYING APPARATUS

This application claims the benefit of Provisional Application No. 61/086,545 filed on Aug. 6, 2008.

TECHNICAL FIELD AND BACKGROUND OF THE INVENTION

The present invention relates to the field of recycling. In particular, the invention relates to a recycling system and carrying apparatus to allow individuals to carry recycling containers and the like.

Over the years, recycling has become a very important function in the battle against pollution. At the heart of recycling programs is the dependency on individuals to separate recyclable items from non-recyclable items so that those items are not disposed of in a garbage dump. As a result, the recyclable items are sent to a recycling facility for processing into new recyclable items, such as water bottles.

In an effort to promote recycling, cities and their waste disposal counterparts are providing recycling bins or containers to residents. These bins are provided to encourage the residents to separate the recyclable items from the non-recyclable items. The recyclable items are placed in the recycling bins so that the waste disposal company knows that the items in the bin are to be processed in a recycling facility instead of a garbage dump.

Unfortunately, these recycling bins can become quite heavy and hard to move due to the fact that the bins must be carried. As a result, individuals may not fully utilize the recycling bins due to the weight or not use the bins at all. Further, those residents willing to lift the heavy bins subject themselves to injury due to the awkward carrying position and the weight of the bins.

SUMMARY OF THE INVENTION

Accordingly, there is a need for a recycling system and carrying apparatus that encourages individuals to recycle and allows them to safely lift or carry recycling bins.

According to one aspect of the present invention, a carrying apparatus includes at least one support arm adapted to engage a support such that the carrying apparatus hangs therefrom, and at least one carrying arm operably connected to the at least one support arm and adapted to secure an item to be carried by the carrying apparatus, the at least one carrying arm being adapted to pivot relative to the at least one support arm.

According to another aspect of the present invention, a carrying apparatus includes a support platform adapted to engage a support such that the support platform hangs therefrom, and at least one receiver connected to the support platform and adapted to secure an item to be carried by the carrying apparatus.

According to a further aspect of the present invention, a recycling system includes a garbage container, a recycling bin for containing recycled matter, and a carrying apparatus connected to the garbage container. The carrying apparatus includes at least one carrying arm adapted to secure the recycling bin thereto, thereby interconnecting the garbage container and recycling bin to allow a user to carry the recycling bin by moving the garbage container.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Figure 1:
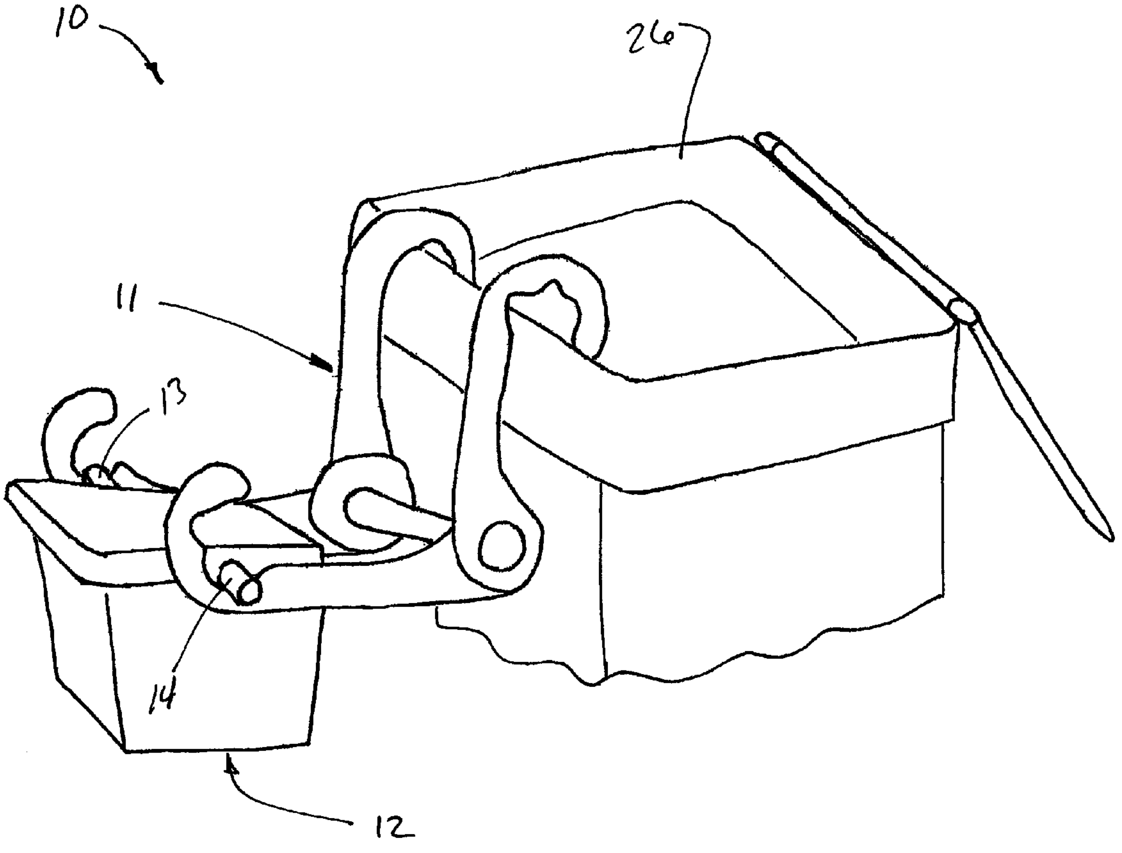
FIG. 1 shows a recycling system according to an embodiment of the invention.

Referring now specifically to the drawings, a recycling system according to an embodiment of the invention is illustrated in FIG. 1 and shown generally at reference numeral 10. The system 10 includes a carrying apparatus 11 and a recycling bin 12 having supports 13 and 14 extending outwardly from respective sides 16 and 17 of the bin 12.

Figure 2:
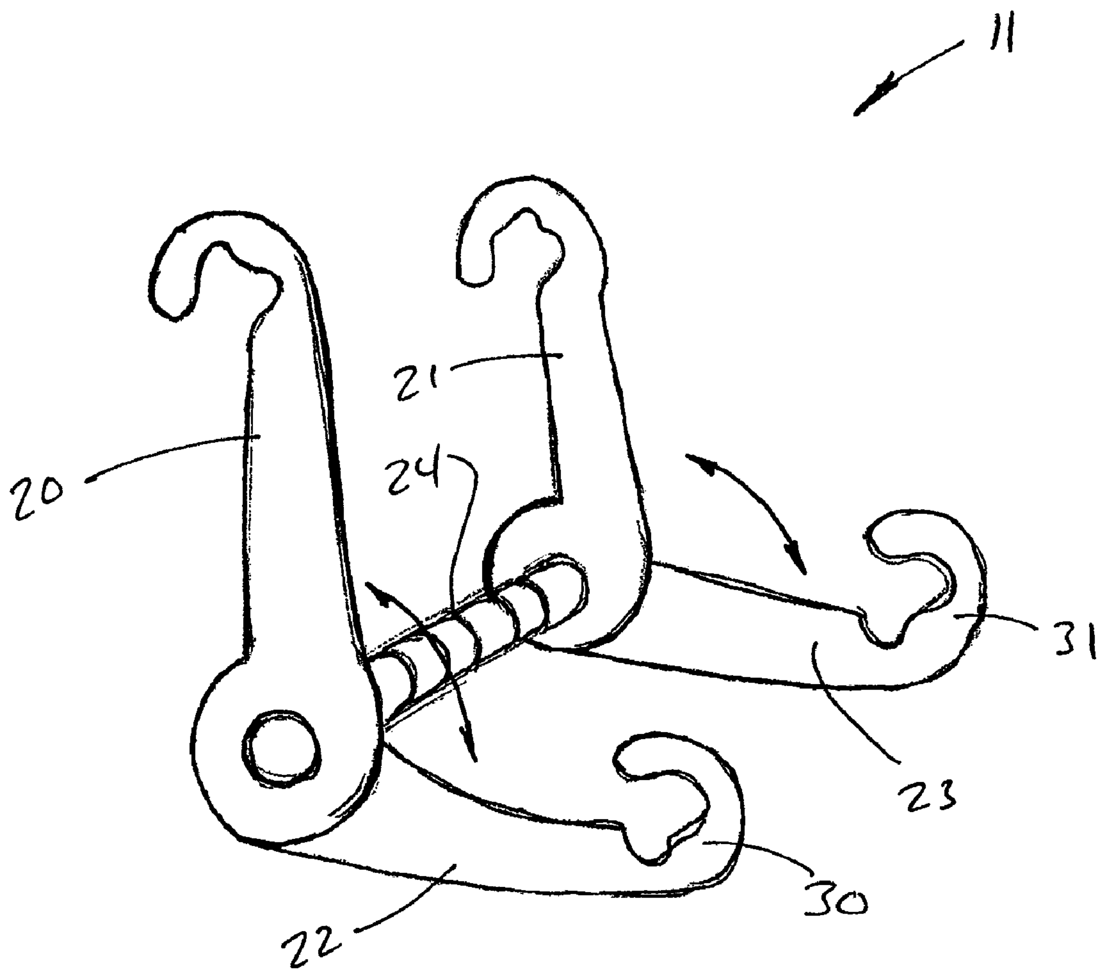
FIG. 2 shows a carrying apparatus of the system of FIG. 1.
Figure 3:
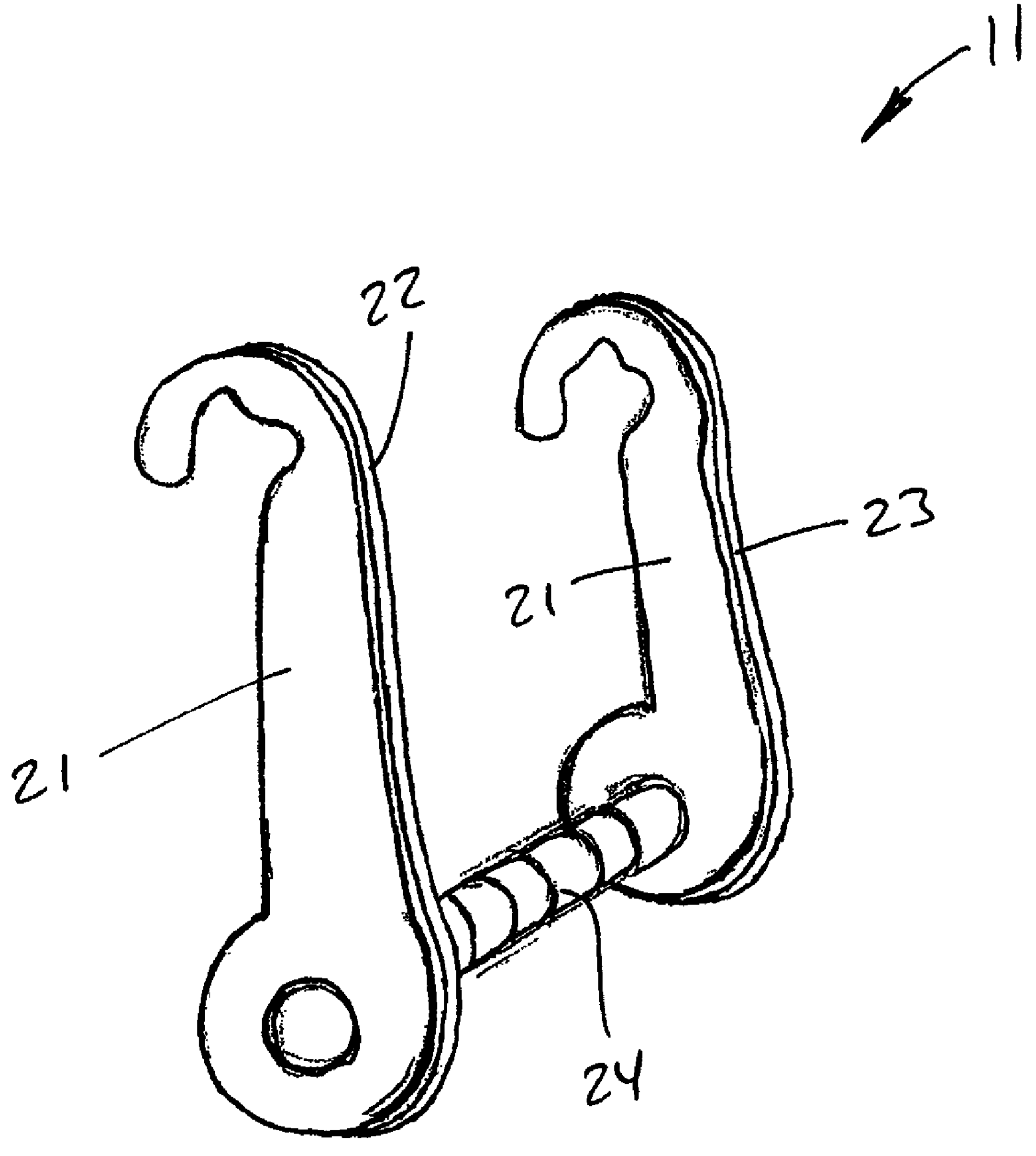
FIG. 3 shows the carrying apparatus of FIG. 2 in a collapsed position.
Figure 4:
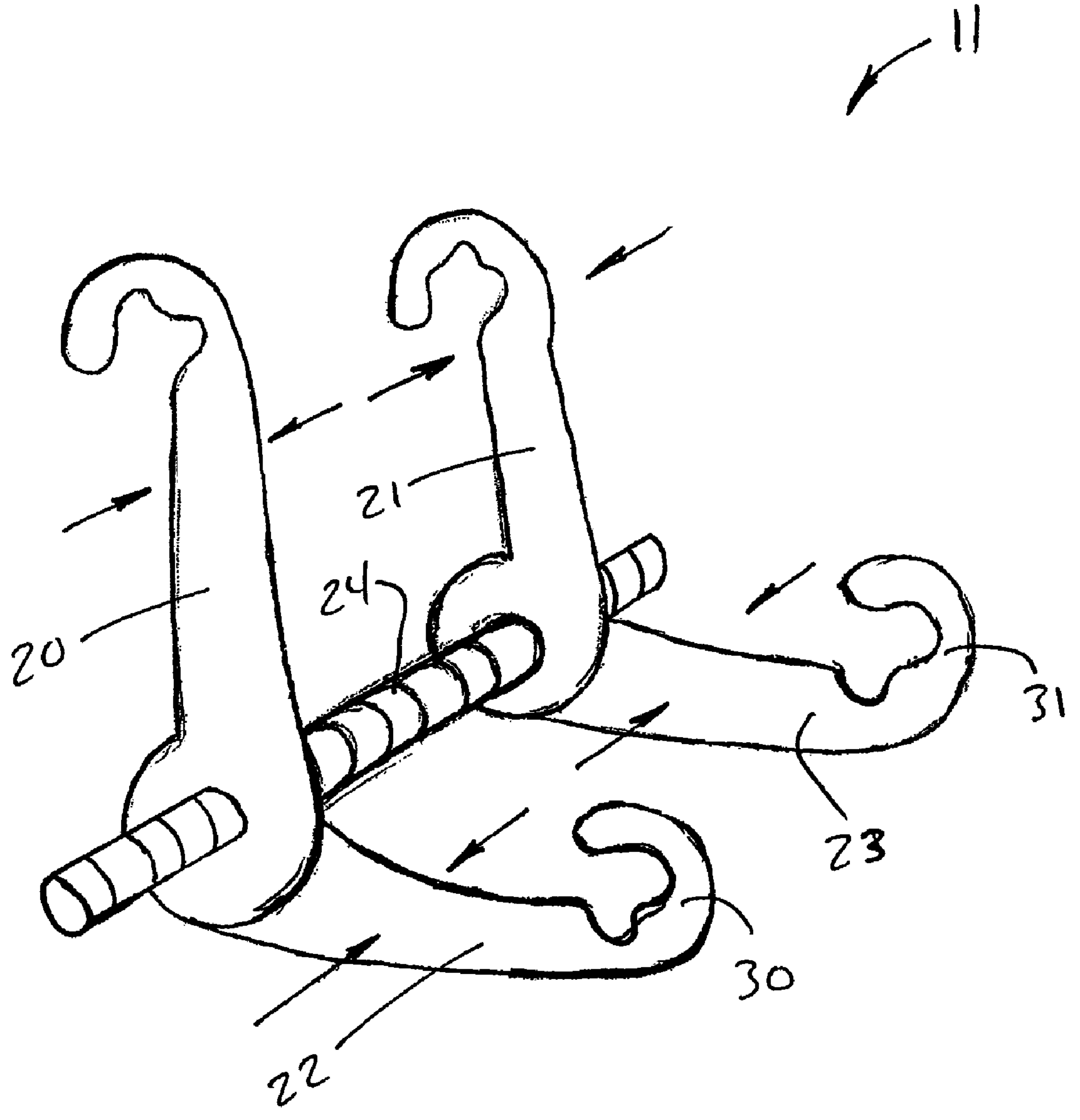
FIG. 4 shows the carrying apparatus of FIG. 2 in a narrowed position.

Referring to FIG. 2, the carrying apparatus 11 includes a pair of support arms 20 and 21, a pair of carrying arms 22 and 23, and a shaft 24. The support arms 20, 21 and carrying arms 22, 23 are pivotally connected to the shaft 24 and rotatable with respect to each other to allow the carrying apparatus 11 to collapse from a use position to a compact non-use position, as shown in FIG. 3. The support arms 20, 21 and carrying arms 22, 23 are also slidable along the shaft 24, as shown in FIG. 4, to allow the apparatus 11 to be adapted for containers of various sizes.

The support arms 20 and 21 support or allow the carrying apparatus 11 to hang from a support such as a garbage container 26, as shown in FIG. 1. The support arms extend outwardly from the shaft 24 and include hook-type ends 27 and 28 for hooking onto the garbage container 26. Like the support arms 20 and 21, the carrying arms 22 and 23 also extend outwardly from the shaft 24 and include receivers 30 and 31, respectively. The receivers 30 and 31 are adapted to receive the supports 13 and 14 of the bin 12, such that the bin is securely supported by the apparatus 11. It should be appreciated that the carrying apparatus is not limited to recycling bins and may be used to carry other types of containers, such as a bucket.

Figure 5:
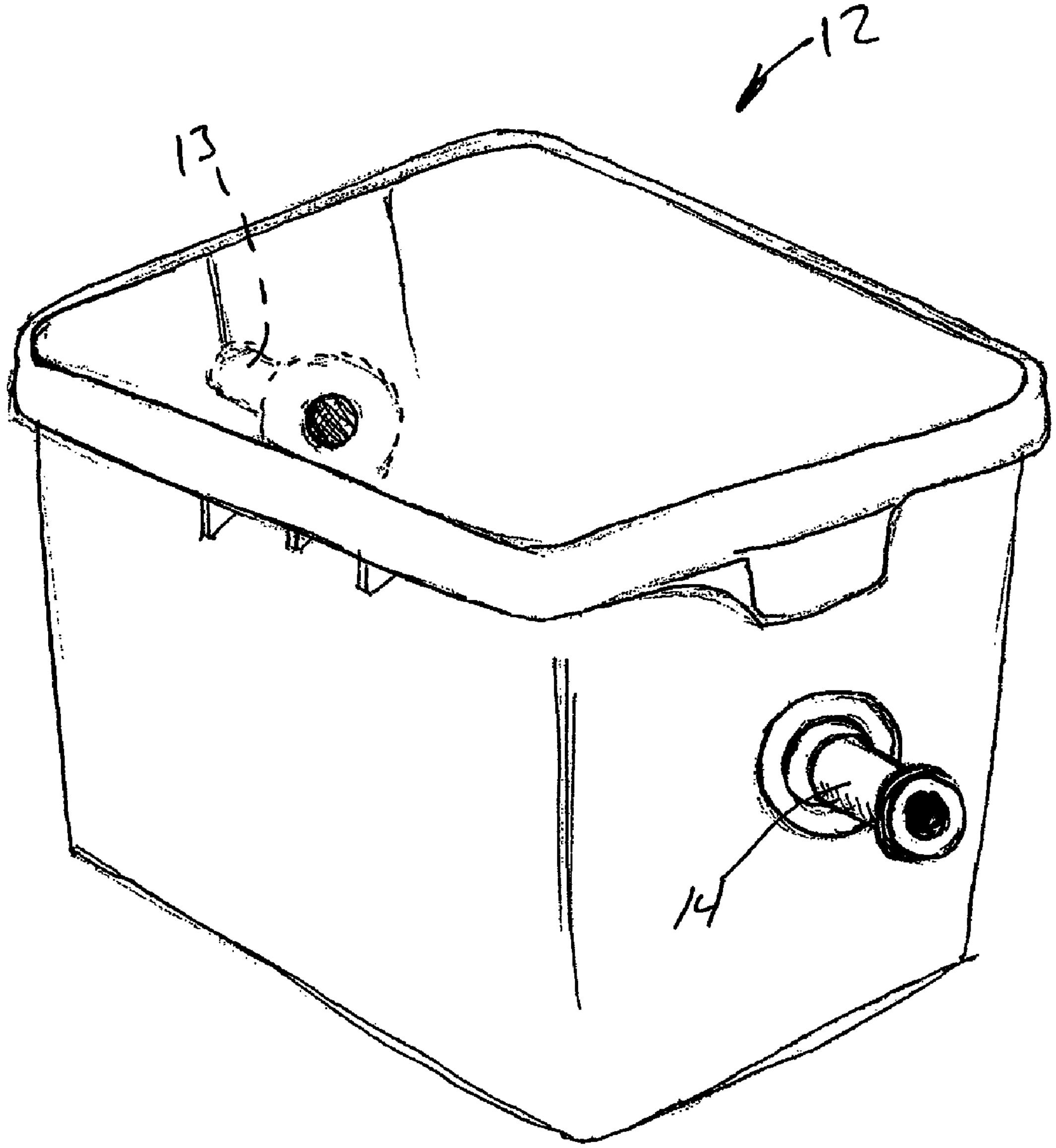
FIG. 5 shows a container of the system of FIG. 1.
Figure 6:
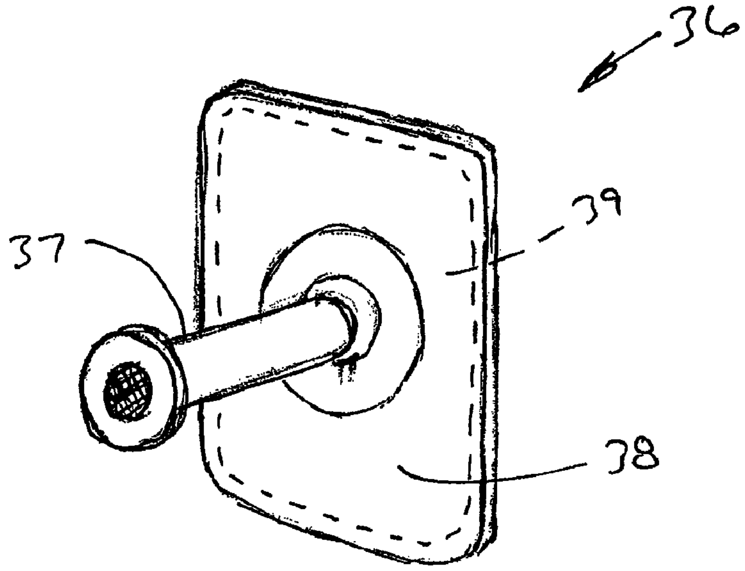
FIG. 6 shows a support for use on a container.
Figure 7:
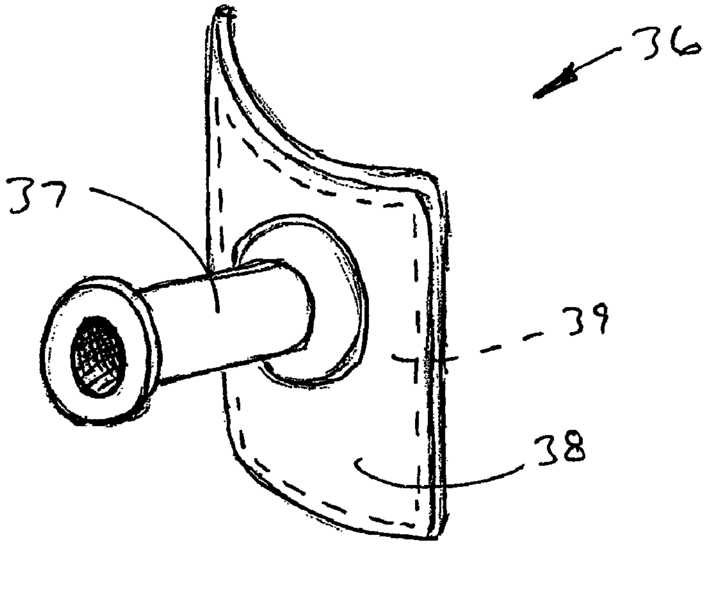
FIG. 7 shows a support for use on a container.

Referring to FIG. 5, the supports 13 and 14 may be integrally formed with the sides 16 and 17 and may be in the form of pegs or other suitable types of supports for use with the carrying apparatus 11. For existing recycling bins that do not have supports formed on the sides, support 36, FIG. 6, may be added to the sides of the bins. As shown, the support 36 includes a peg 37 extending outwardly from a base 38. The base 38 includes an adhesive backing 39 to allow the support 36 to be adhered to a bin. It should be appreciated that other methods of connection, such as welding, may be used to adhere the base 38 to a bin. As shown in FIG. 7, the base 38 may also be shaped to conform to a shape of a container. For example, a curved base may be suitable for a bucket, whereas a planar base may be suitable for a flat surface.

Figure 8:
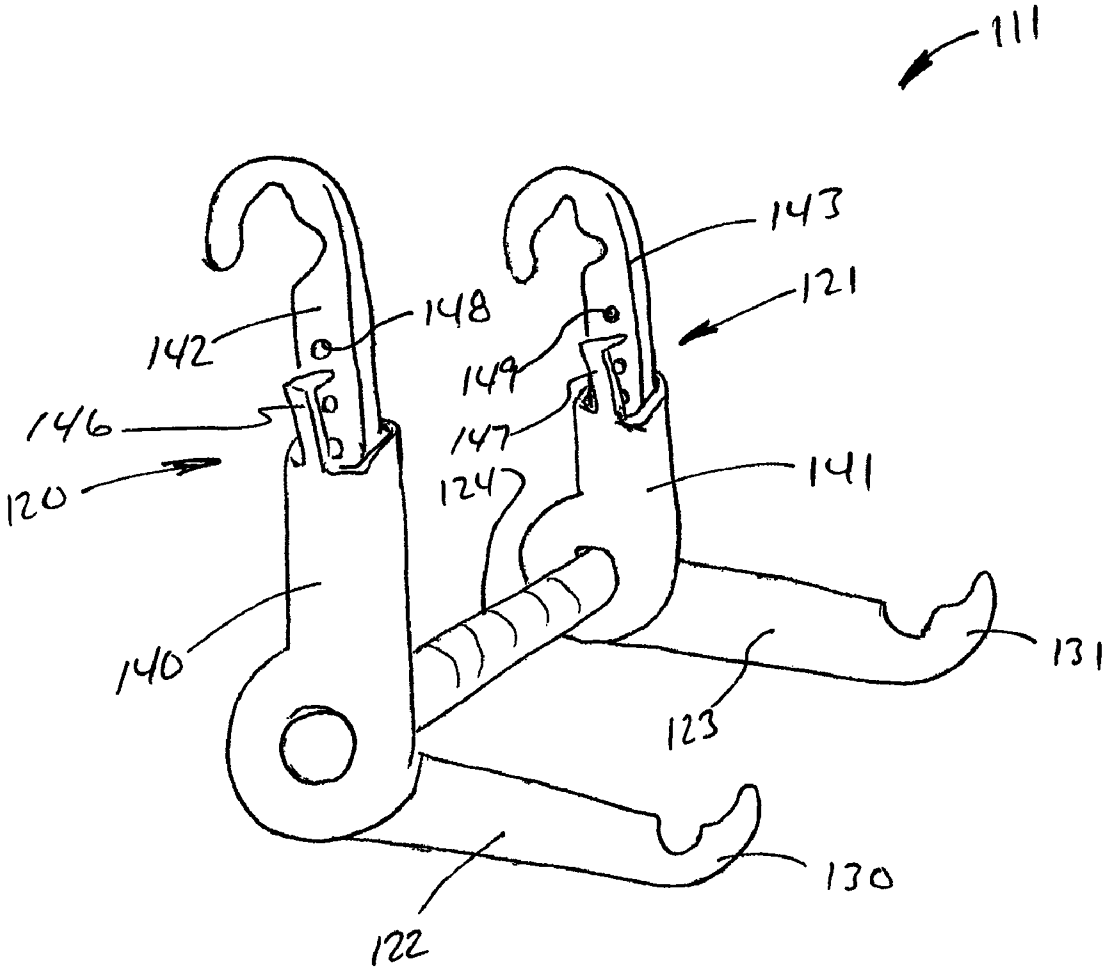
FIG. 8 shows an adjustable carrying apparatus for use in the system of FIG. 1.

Referring to FIG. 8, like carrying apparatus 11, carrying apparatus 111 includes support arms 120, 121 and carrying arms 122, 123 and a shaft 124. Unlike carrying apparatus 11, the support arms 120 and 121 of the carrying apparatus 111 are adapted to allow for height adjustment of the carrying apparatus 111. The arms 120 and 121 each include a receiving portion 140 and 141 and extending portions 142 and 143. The receiving portions 140 and 141 receive the extending portions 142 and 143 therein and allow the extending portions to slide within the receiving portions 140 and 141 to adjust the apparatus 111 to a desired height. Tensioners or pins 146 and 147 engage apertures 148 and 149 of the extending portions 142, 143, respectively, to secure the extending portions 142 and 143 in the desired position.

Figure 9:
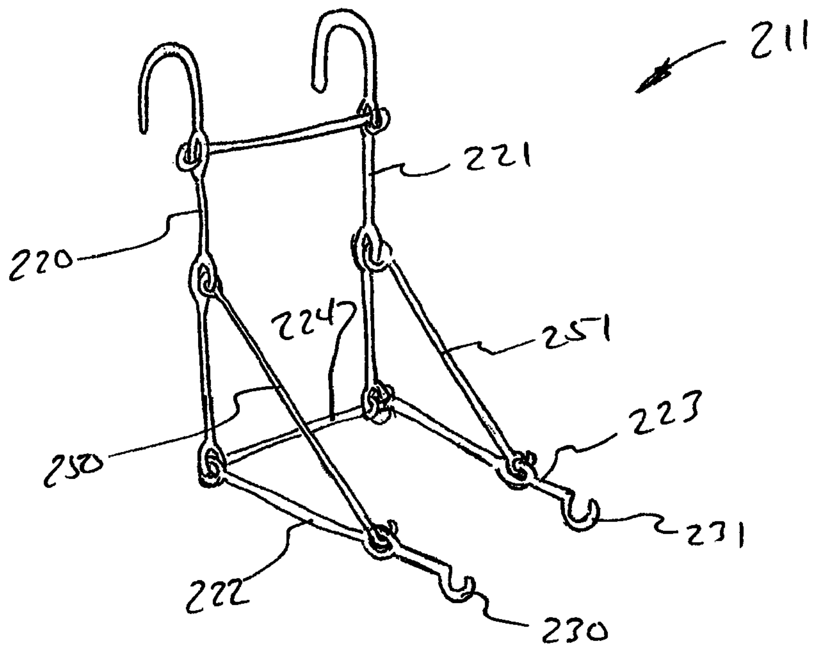
FIG. 9 shows a carrying apparatus according to an embodiment of the invention.
Figure 10:
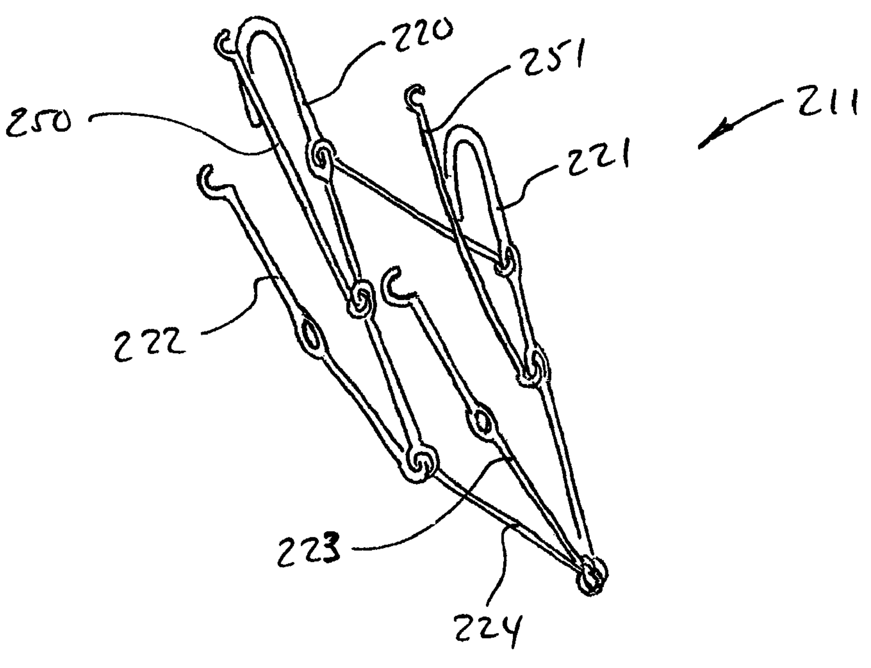
FIG. 10 shows the carrying apparatus of FIG. 9 in a folded position.

In another embodiment, shown in FIG. 9, a carrying apparatus 211 is formed using a plurality of links hooked together. The links when hooked together form the carrying apparatus 211. Like apparatus 11, the links form support arms 220 and 221, carrying arms 222 and 223, and shaft 224. Further, the links form support braces 250 and 251. The support braces 250 and 251 secure the apparatus 211 in a use position by extending between the support arms 220, 221 and carrying arms 222, 223 to provide a rigid brace therebetween and prevent folding. When not in use, the support braces 250 and 251 are unhooked from the carrying arms 222 and 223 to allow the apparatus 211 to fold, as shown in FIG. 10.

Figure 11:
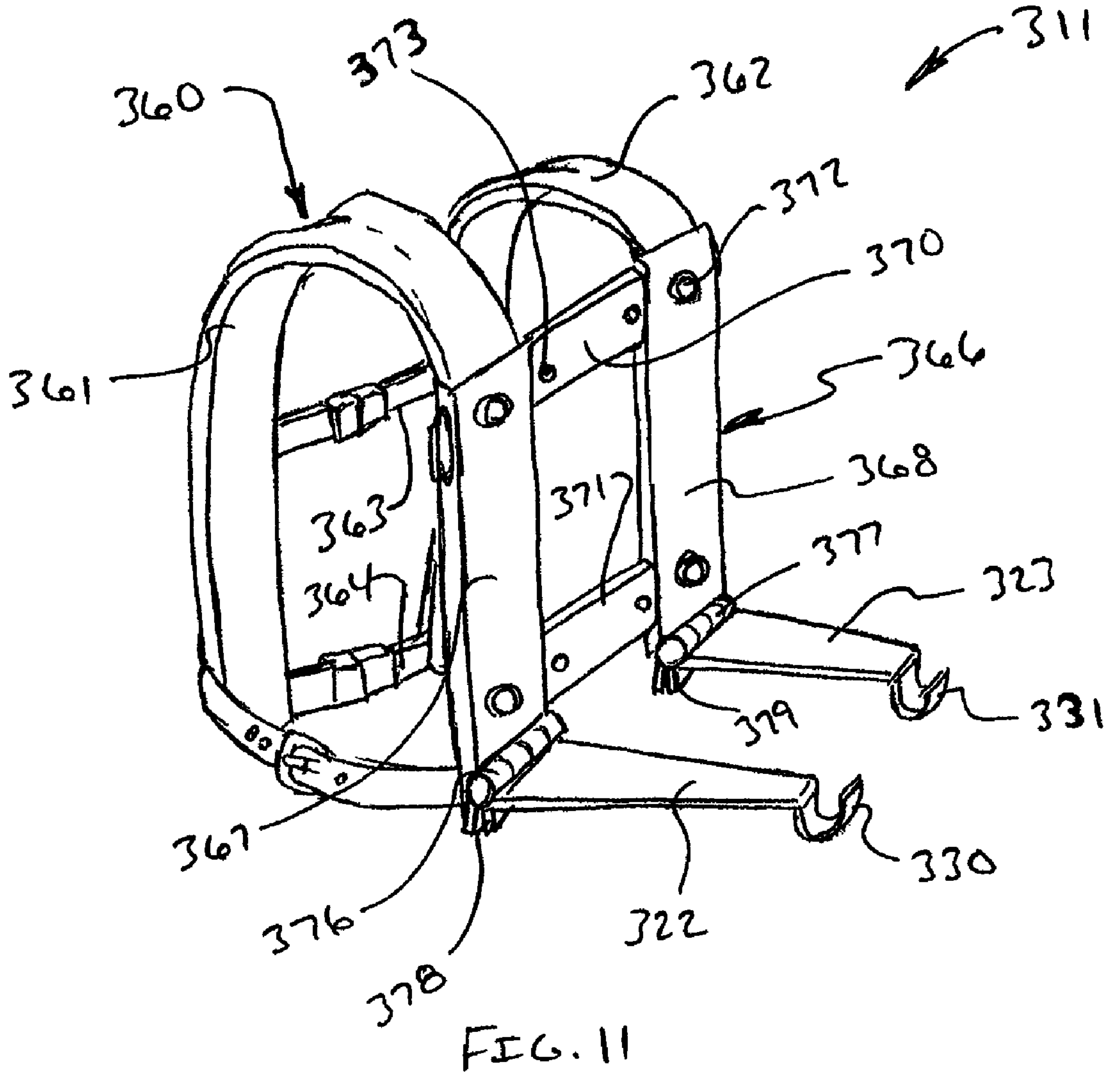
FIG. 11 shows a carrying apparatus according to an embodiment of the invention.

Referring to FIG. 11, a carrying apparatus according to another embodiment is shown at reference numeral 311. The carrying apparatus 311 includes a shoulder harness 360 having a pair of shoulder straps 361 and 362 connected by securing straps 363 and 364, a support base 366, and a pair of carrying arms 322 and 323 having receivers 330 and 331. The support base 366 includes a pair of vertical supports 367 and 368 inter-connected by cross-members 370 and 371. The supports 367 and 368 may be adjusted along the cross-members 370 and 371 such that the support base 366 may be narrowed or widened by removing a pin 372 or other type of locking mechanism from engagement with apertures 373 spaced along the cross-members 370 and 371.

The carrying arms 322 and 323 are pivotally connected to the vertical supports 367 and 368 by hinges 376 and 377. Supports 378 and 379 are positioned below the hinges 376 and 377 and for interaction with the carrying arms 322, 323 and the vertical supports 367 and 368 to support the arms 322 and 323 and prevent damaging of the hinges 376 and 377.

Figure 12:
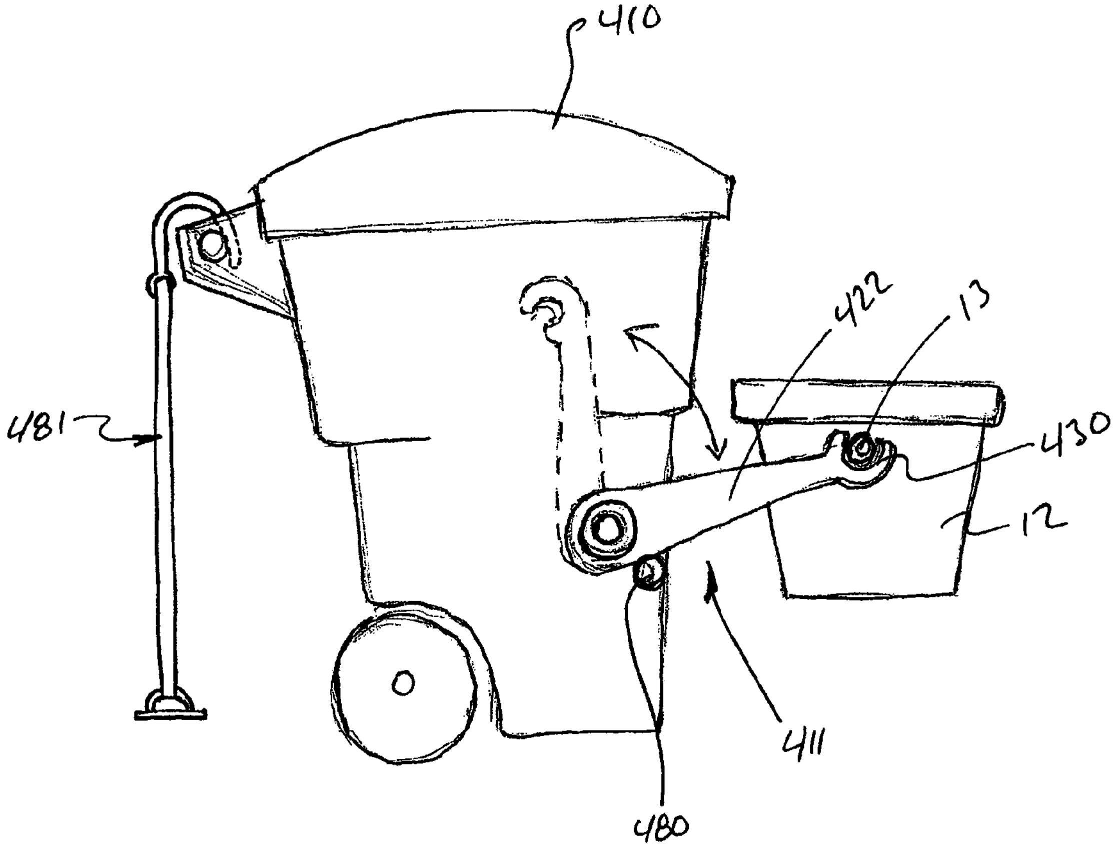
FIG. 12 shows a garbage container according to an embodiment of the invention.

Referring to FIG. 12, a garbage container 410 having a carrying apparatus 411 is shown. As illustrated, the carrying apparatus 411 includes a pair of carrying arms 422 and 423 having receivers 430 and 431 for engaging support 13 and 14 of the bin 12. The arms 422 and 423 are pivotally connected to the garbage container 410 and rotate between a non-use position and a use position. Arm stops 480 are connected to the garbage container 410 and are positioned such that when the arms 422 and 423 are in the use position, the stops 480 provide a support to the arms 422, 423 to prevent the arms from falling. An anchor 481 such as a strap hooked to a back of the container 410 and attached to an anchoring point may also be used to prevent the container 410 from tipping over due to the weight of the bin 12.

Figure 13:
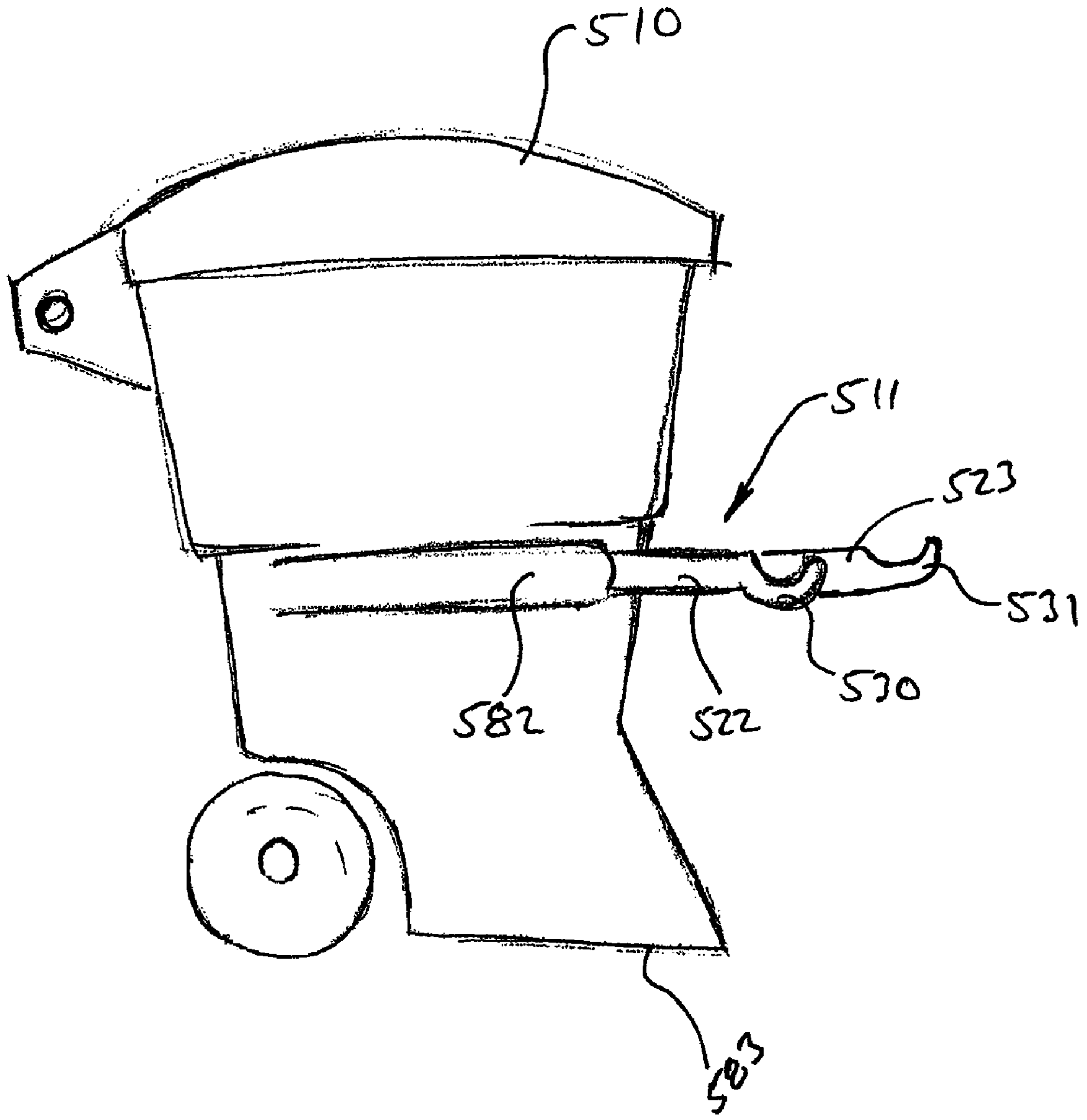
FIG. 13 shows a garbage container according to an embodiment of the invention.

As shown in FIG. 13, garbage container 510 includes a carrying apparatus 511. The carrying apparatus 511 includes a pair of carrying arms 522 and 523 having receivers 530 and 531 for engaging supports 13 and 14 of the bin 12 (shown in FIG. 1). The carrying arms 522 and 523 retract into pockets 582 of the garbage container 510 when not in use. A bottom portion 583 of the container 510 extends outwardly to prevent the weight of a loaded bin 12 from tipping the container 510.

Figure 14:
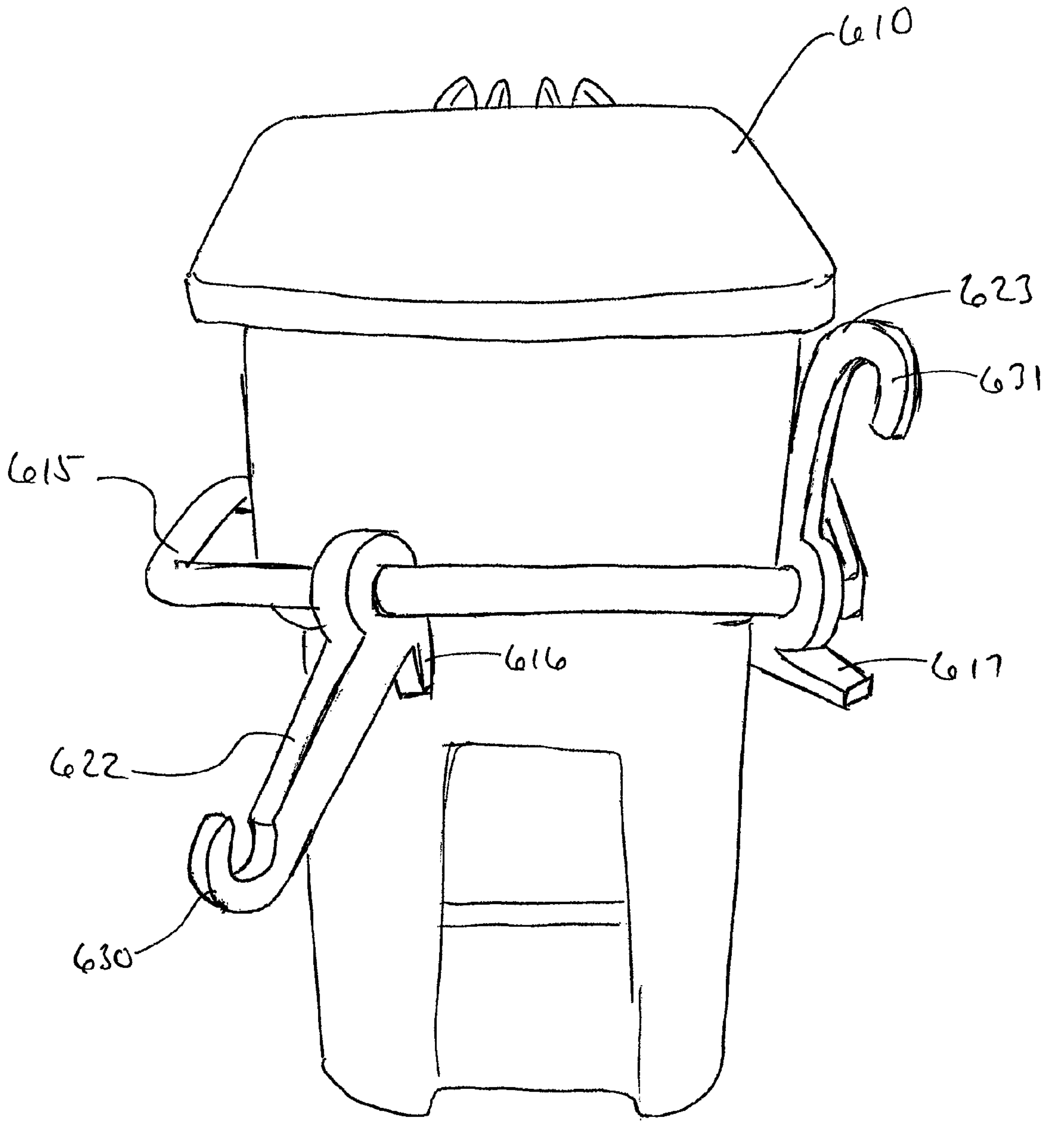
FIG. 14 shows a garbage container according to an embodiment of the invention.

Referring to FIG. 14, a garbage container 610 according to an embodiment of the invention is illustrated. The garbage container 610 includes a rail 615 connected to and positioned around the garbage container 610. A pair of carrying arms 622 and 623 are slidably connected to the rail 615 and include receivers 630 and 631 for engagement with supports 13 and 14 of bin 12 (shown in FIG. 1). The carrying arms 622 and 623 also include stops 616 and 617 for engagement with the garbage container 610 to support the arms 622 and 623 in a use position. When not in use, the arms 622 and 623 are slid along the rail 615 to the side of the container 610 into a storage position.

Figure 15:
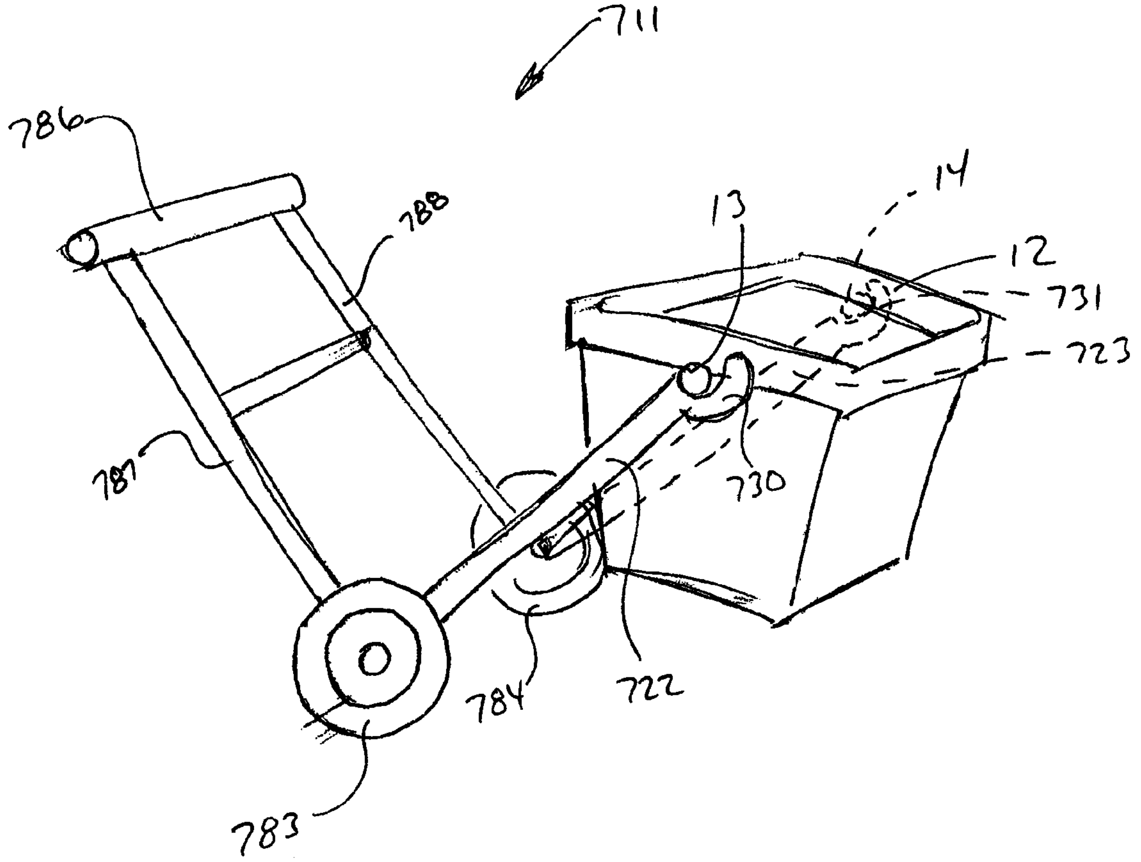
FIG. 15 shows a carrying apparatus according to an embodiment of the invention.
Figure 16:
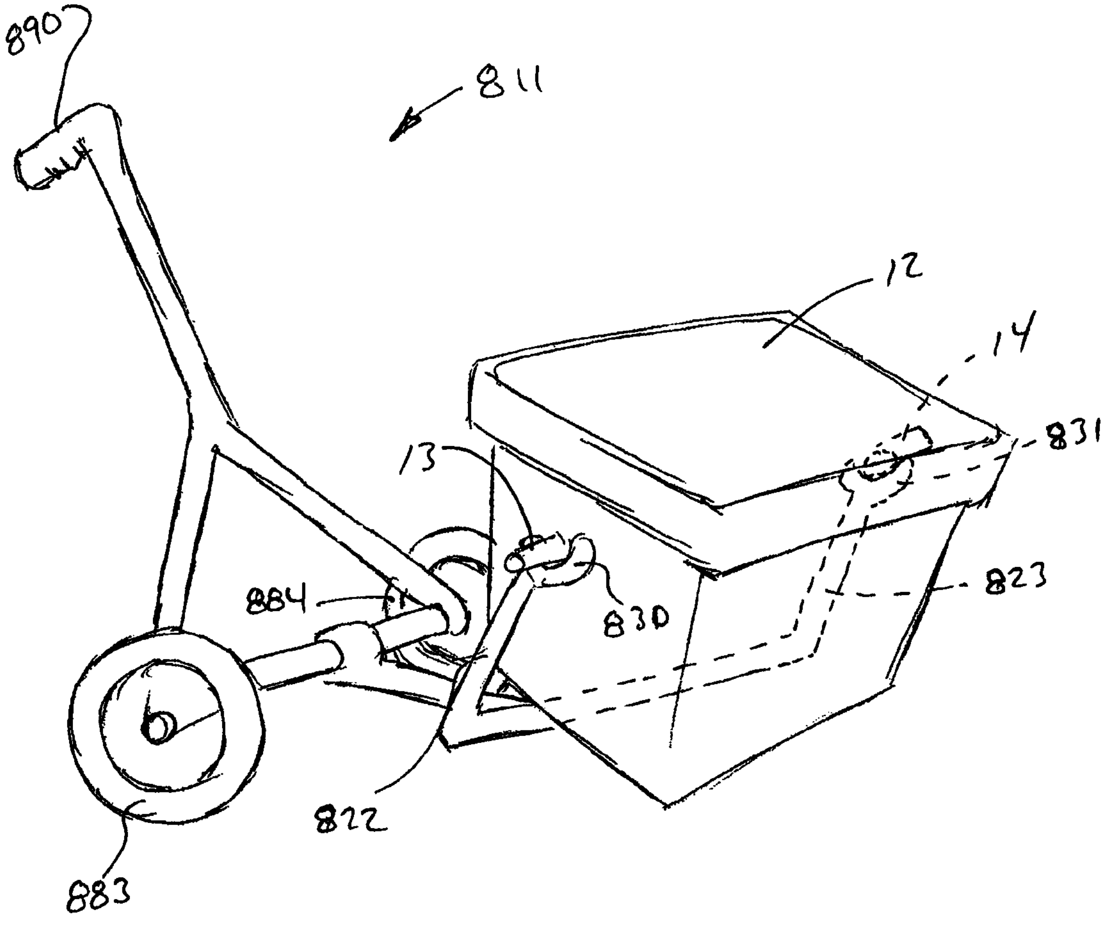
FIG. 16 shows a carrying apparatus according to an embodiment of the invention.

Referring to FIGS. 15 and 16, carrying apparatuses 711 and 811 are illustrated. As shown, the carrying apparatuses 711 and 811 are dolly-type carriers. The apparatus 711 includes a pair of carrying arms 722 and 723 having receivers 730 and 731 for engaging supports 13 and 14 of bin 12, wheels 783 and 784 for allowing the apparatus 711 to be easily moved, and a handle bar 786 attached to two supports 787 and 788. The apparatus 811 is similar to the apparatus 711 in that it also includes a pair of carrying arms 822 and 823 having receivers 830 and 831 and wheels 883 and 884. However, the apparatus 811 is designed for use with one hand and includes a handle grip 890 instead of a handle bar.

Figure 17:
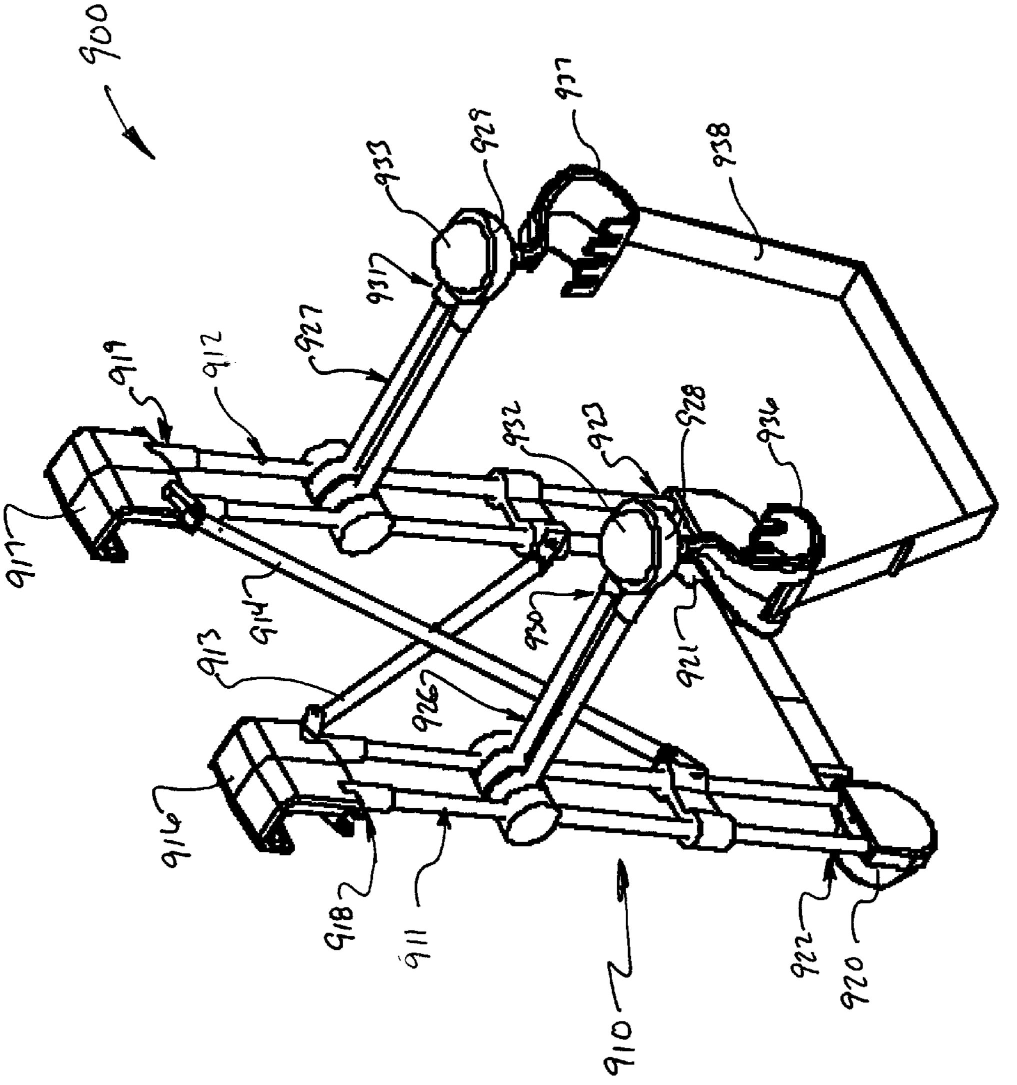
FIG. 17 is a perspective view of a carrying apparatus according to an embodiment of the invention.

Referring to FIG. 17, a carrying apparatus according to an embodiment of the invention is shown generally at reference numeral 900. The carrying apparatus 900 includes a support platform 910 having first and second elongate support arms 911 and 912 interconnected by cross-members 913 and 914. The support arms 911 and 912 include hook-type ends 916 and 917, respectively, positioned on first ends 918 and 919 of the support arms 911 and 912 for engaging a support, such as a rim 950 of a garbage container 951 (shown in FIGS. 21 and 22), thereby allowing the carrying apparatus 900 to hang from the support. Base pads 920 and 921 are positioned on opposing, second ends 922 and 923 of the support arms 911 and 912 to provide a cushion against a side of a garbage container or other type of support when a load is carried by the carrying apparatus 900.

Carrying arms 926 and 927 are pivotally connected to support arms 911 and 912, respectively, and are moveable between a storage position and a use position. Sockets 928 and 929 are positioned on ends 930 and 931 of the carrying arms 926 and 927, respectively. The sockets 930 and 931 are adapted to receive balls 932 and 933 of receivers 936 and 937 to form a ball and socket connection which allows the receivers 936 and 937 to pivot in the sockets 930 and 931. A support strap 938 interconnects the receivers 936 and 937 and provides additional support for carrying a load.

Figure 18:
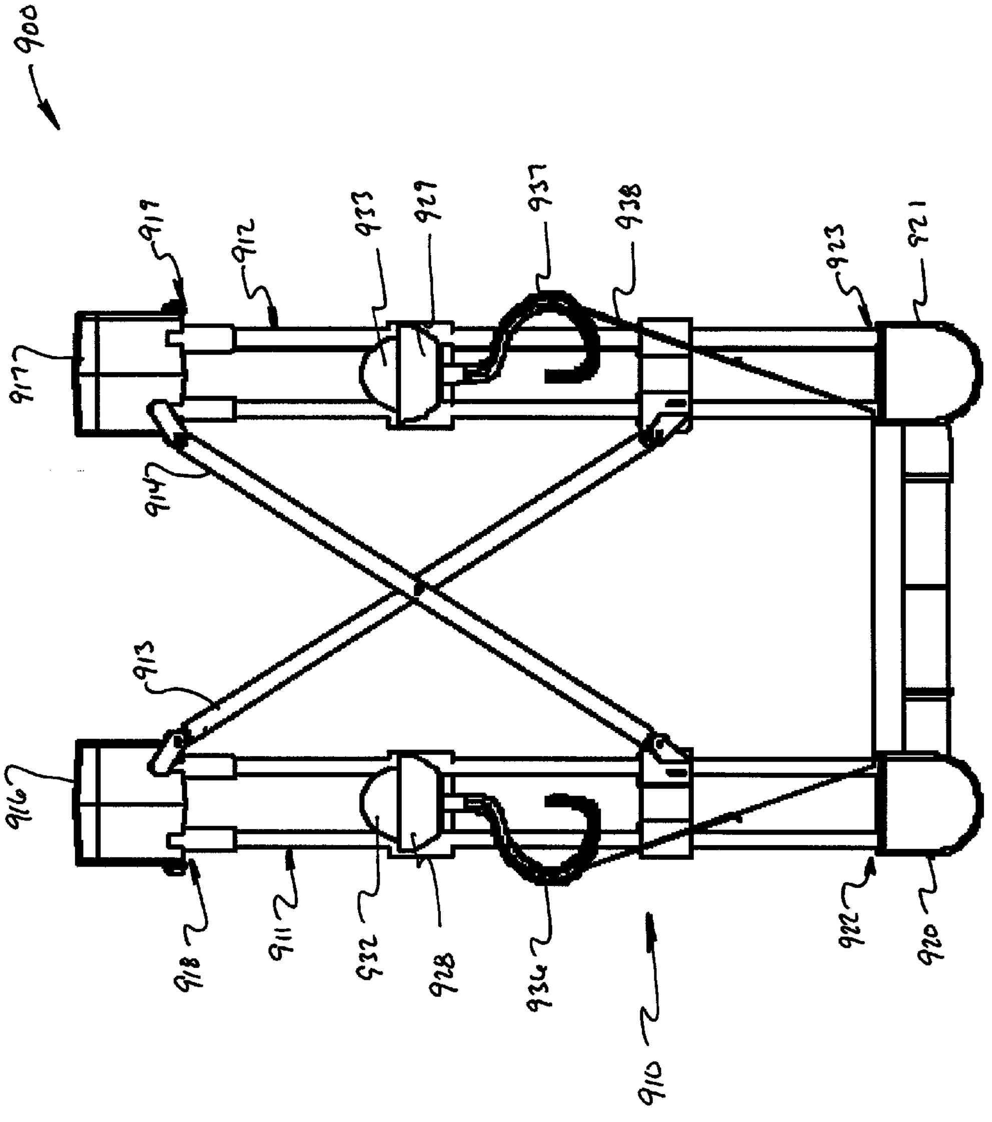
FIG. 18 is a front view of the carrying apparatus of FIG. 17.
Figure 19:
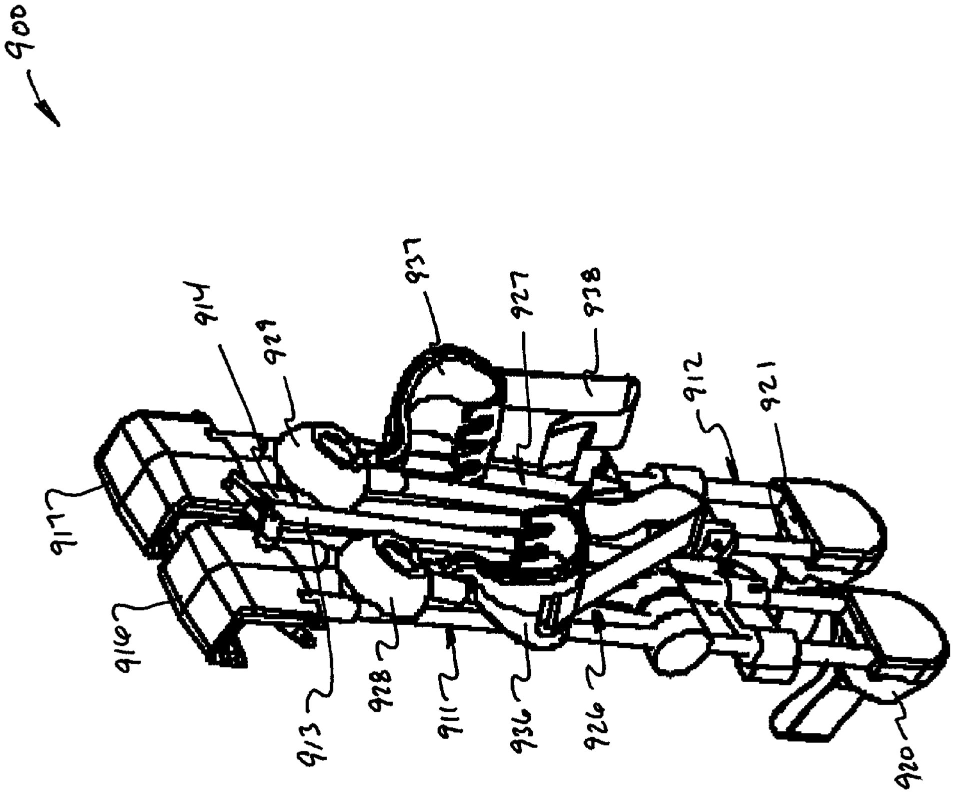
FIG. 19 is a perspective view of the carrying apparatus of FIG. 17 in a collapsed condition.
Figure 20:
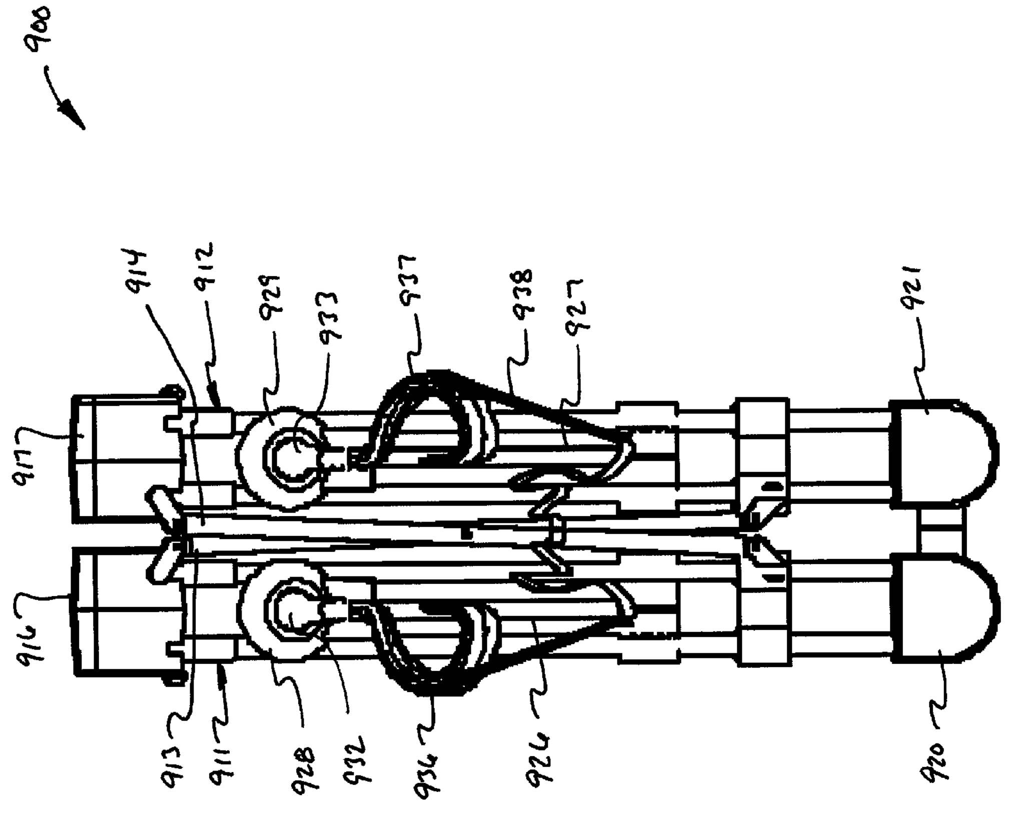
FIG. 20 is a front view of the carrying apparatus of FIG. 17 in a collapsed condition.

As shown in FIG. 18, the cross-members 913 and 914 are pivotally connected to the support arms 911 and 912 to allow the carrying apparatus 900 to move between a use position, FIG. 18, to a collapsed storage position, FIGS. 19 and 20. As illustrated in FIGS. 19 and 20, the carrying arms 926 and 927 are pivoted such that the carrying arms lie adjacent to the support arms 911 and 912. Further, the receivers 936 and 937 rotate in the sockets 930 and 931 so that they are moved into a storage position.

Figure 21:
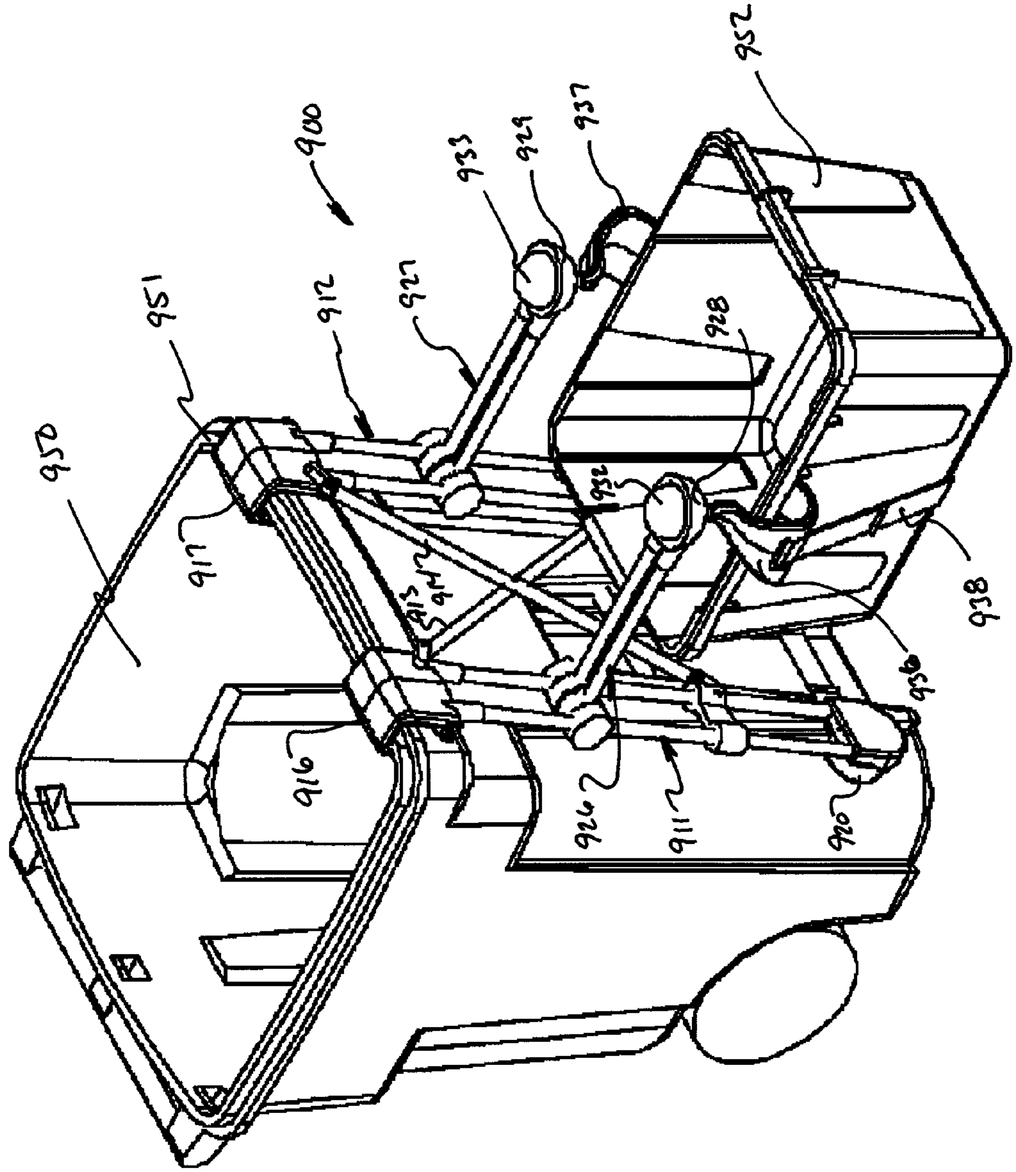
FIG. 21 is a perspective view of the carrying apparatus of FIG. 17 attached to a garbage container.
Figure 22:
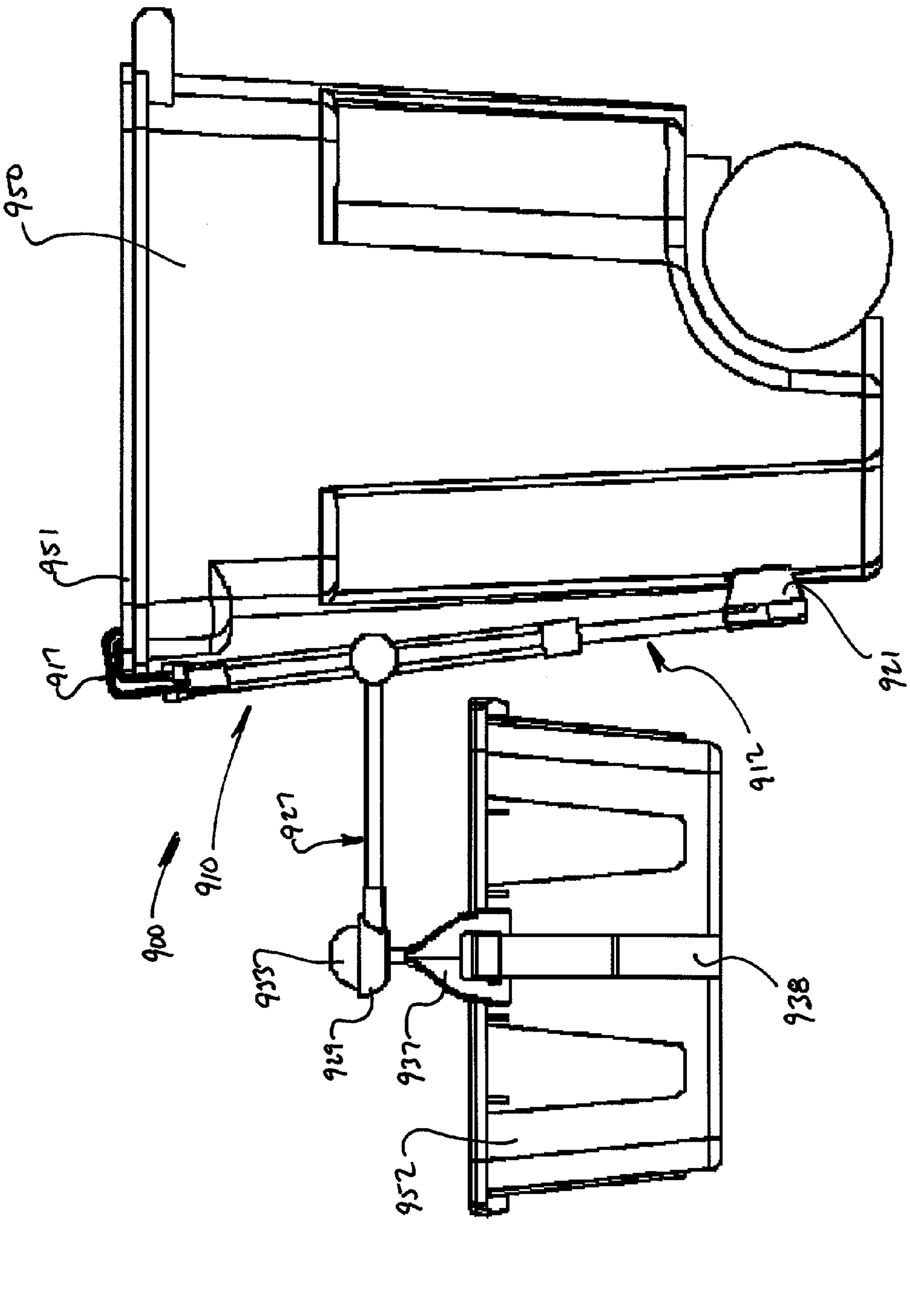
FIG. 22 is a side view of the carrying apparatus of FIG. 17 attached to a garbage container.

While the following is described with respect to a garbage container, it should be appreciated that the carrying apparatus may be used with other types of supports. Referring to FIGS. 21 and 22, in use, the carrying apparatus is attached to a support such as garbage container 950. This is done by engaging the hook-type ends 916 and 917 with the rim 951 of the garbage container 950. The support platform 910 rests adjacent to a side of the garbage container 950 such that the base pads 920 and 921 rest against the side to provide support to the carrying apparatus 900, as well as, provide a cushion between the support platform 910 and the garbage container 950.

Once the carrying apparatus is secured to the garbage container 950, the carrying arms 926 and 927 are positioned in the use position. As a result, the receivers 936 and 937 will rotate to a use position. Once the receivers 936, 937 and carrying arms 926, 927 are in the use position, a container, such as a recycling bin 952 may be placed between the receivers 936 and 937 such that the receivers grasp the bin 952 and support it. The strap 938 goes under the bin 952 and provides additional support. The strap 952 may be adjusted to fit containers of various sizes. With the recycle bin secured to the carrying apparatus 900, a user can then wheel the garbage container 950 and recycle bin 952 out to the curb for pick up. It should be appreciated that the receivers 936 and 937 may be used to support various types of containers or items, such as buckets and milk jugs. It should also be appreciated that the receivers 936 and 937 may be used separately or in conjunction with each other.

A recycling system and carrying apparatus is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A carrying apparatus, comprising:

(a) first and second support arms adapted to engage a support such that the carrying apparatus hangs therefrom, each of the first and second support arms including a hook-type end positioned on a first end of the support arm and a base pad positioned on a second end of the support arm;

(b) a first carrying arm pivotally connected to the first support arm and a second carrying arm pivotally connected to the second support arm, wherein the first and second carrying arms are pivotally connected to the first and second support arms at a position between the first and second ends;

(c) a first socket connected to a free end of the first carrying arm and a second socket connected to a free end of the second carrying arm;

(d) a first receiver having a ball for being received in the first socket and a claw-type end for securing and carrying an item and a second receiver having a ball for being received in the second socket and a claw-type end for securing and carrying an item, wherein the ball of the first receiver is freely moveable with respect to the first socket to allow the first receiver to move freely and the ball of the second receiver is freely moveable with respect to the second socket to allow the second receiver to move freely.

2. A carrying apparatus, comprising:

(a) a support platform adapted to engage a support such that the support platform hangs therefrom, the support platform having first and second support arms, each of the first and second support arms having a hook-type end positioned on a first end of the support arm to allow the support platform to hang from the support;

(b) a first carrying arm connected to the first support arm and having a receiver connected to a free end of the first carrying arm and a second carrying arm connected to the second support arm and having a receiver connected to a free end of the second carrying arm to secure an item to be carried by the carrying apparatus ;and (c) wherein the receivers are connected to the free ends of the first and second carrying arms by a ball and socket connection to allow the receivers to freely move with respect to the first and second carrying arms.

3. The carrying apparatus according to claim 2, wherein the first and second support arms are interconnected by first and second cross-members to allow the support platform to move between a storage position and a use position, wherein a first end of the first and second cross-members is pivotally connected to respective first ends of the first and second support members and a second end of the first and second cross-members is pivotally connected to respective sliding mechanisms adapted to slide along the first and second support members to allow the support platform to move between the storage and use position.

4. The carrying apparatus according to claim 2, wherein the first and second carrying arms are pivotally connected to the first and second support arms at a position between first and second ends of the first and second support arms such that when the first and second carrying arms are moved to a storage position, the first and second support arms do not extend past the first end of the first and second support arms.

5. The carrying apparatus according to claim 2, wherein the socket of the ball and socket connection is connected to the free ends of the first and second carrying arms.

6. The carrying apparatus according to claim 5, wherein the receiver includes the ball of the ball and socket connection and a claw-like end for securing an item for carrying.

7. The carrying apparatus according to claim 6, further including a support strap interconnecting the claw-type ends of the first and second carrying arms.

* * * * *